(12) United States Patent
Luo et al.

(10) Patent No.: US 12,439,808 B2
(45) Date of Patent: Oct. 7, 2025

(54) DISPLAY PANEL

(71) Applicant: Wuhan China Star Optoelectronics Semiconductor Display Technology Co., Ltd., Hubei (CN)

(72) Inventors: Leilei Luo, Hubei (CN); Zengjian Jin, Hubei (CN); Yalong Ma, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/795,592

(22) PCT Filed: Jun. 10, 2022

(86) PCT No.: PCT/CN2022/098139
§ 371 (c)(1),
(2) Date: Jul. 27, 2022

(87) PCT Pub. No.: WO2023/226099
PCT Pub. Date: Nov. 30, 2023

(65) Prior Publication Data
US 2024/0188402 A1    Jun. 6, 2024

(30) Foreign Application Priority Data
May 27, 2022   (CN) .......................... 202210592116.3

(51) Int. Cl.
*H10K 59/80* (2023.01)
*G06F 3/041* (2006.01)
(Continued)

(52) U.S. Cl.
CPC ....... *H10K 59/8792* (2023.02); *G06F 3/0412* (2013.01); *H10K 59/40* (2023.02); *G06F 3/0446* (2019.05); *H10K 59/35* (2023.02)

(58) Field of Classification Search
CPC .... H10K 59/8792; H10K 59/40; H10K 59/35; H10K 59/131; H10K 50/865; G06F 3/0412; G06F 3/0446; G06F 2203/04112
See application file for complete search history.

(56) References Cited

U.S. PATENT DOCUMENTS

2008/0122792 A1   5/2008   Izadi et al.
2016/0217751 A1   7/2016   Lahti
(Continued)

FOREIGN PATENT DOCUMENTS

CN   104009067   8/2014
CN   108183110   6/2018
(Continued)

OTHER PUBLICATIONS

International Search Report and the Written Opinion Dated Dec. 16, 2022 From the International Searching Authority Re. Application No. PCT/CN2022/098139 and Its Translation Into English. (18 Pages).

(Continued)

*Primary Examiner* — Mohammed R Alam

(57) ABSTRACT

The present application relates to a display panel. Wires in an infrared light-transmitting region of the present application are located outside an opening region, thereby improving light transmittance of the opening region and improving infrared communication performance of the display panel. It prevents the wires from shielding the opening region to increase the light transmittance thereof and to reach the standard the light transmittance, which conducts infrared communication performance of the display panel improved.

8 Claims, 6 Drawing Sheets

(51) Int. Cl.
H10K 59/40 (2023.01)
*G06F 3/044* (2006.01)
*H10K 59/35* (2023.01)

(56) References Cited

U.S. PATENT DOCUMENTS

2022/0004734 A1* 1/2022 Chen ................ G02F 1/133526
2022/0342528 A1* 10/2022 Niu ..................... G06F 3/0412

FOREIGN PATENT DOCUMENTS

| | | |
|---|---|---|
| CN | 110189627 | 8/2019 |
| CN | 110727373 | 1/2020 |
| CN | 111831163 | 10/2020 |
| CN | 113568526 | 10/2021 |
| CN | 113764602 | 12/2021 |
| CN | 114171571 | 3/2022 |
| CN | 114284322 | 4/2022 |
| WO | WO 2022/052194 | 3/2022 |

OTHER PUBLICATIONS

Notification of Office Action and Search Report Dated Aug. 30, 2024 From the Intellectual Property Office of the People's Republic of China Re. Application No. 202210592116.3 and Its Translation Into English. (18 Pages).

\* cited by examiner

DISPLAY PANEL

RELATED APPLICATIONS

This application is a National Phase of PCT Patent Application No. PCT/CN2022/098139 having International filing date of Jun. 10, 2022, which claims the benefit of priority of Chinese Patent Application No. 202210592116.3 filed on May 27, 2022. The contents of the above applications are all incorporated by reference as if fully set forth herein in their entirety.

FIELD AND BACKGROUND OF THE INVENTION

The present application relates to a technical field of display technology, and in particular, to a display panel.

Organic light-emitting diodes (OLED) relate to a photovoltaic technique that uses an organic semiconductor material to produce reversible discoloration under current drive to achieve multicolor display. The OLEDs are considered to be the most promising new generation of display technology with advantages of thin and light size, high brightness, active lighting, low energy consumption, large viewing angle, fast response, flexibility, wide operating temperature range, low voltage demand, high power saving efficiency, fast response, simple construction, low cost, and high contrast ratio.

In the OLEDs, a polarizer less technique is widely used because it can improve the light output rate of the OLEDs and reduce the power consumption and thickness of the OLEDs by providing a color filter (CF) and a black matrix (BM) instead of the polarizer.

With application of polarizer less technique on OLEDs, touch grids and black matrixes formed by wires of polarizer less panels block infrared light-transmitting regions. As a result, light transmittance in the infrared light-transmitting regions is reduced and cannot meet the standard, resulting in poor infrared communication performance of the OLEDs.

SUMMARY OF THE INVENTION

A display panel is provided in the present application, which can solve the problems in the prior art that a touch grid and a BM block an infrared light-transmitting region, so that a light transmittance of the infrared light-transmitting region is reduced, a standard cannot be reached, and an infrared communication performance of an OLED is poor.

A display panel provided in the present application includes a display area; one or more infrared light-transmitting regions in the display area, and at least one opening region is provided in each of one or more infrared light-transmitting regions; wherein the display panel includes a substrate; a touch layer disposed on the substrate and including a touch electrode; and a black matrix layer disposed on a side of the touch layer away from the substrate and provided with a through-hole; wherein the touch electrode comprises a touch grid formed by a plurality of wires; wherein the through-hole is located in the at least one opening region; wherein the plurality of wire located in the infrared light-transmitting region is located outside the at least one opening region.

Further, the display panel further includes a light-emitting layer disposed between the substrate and the touch layer, wherein the light-emitting layer comprises a plurality of spaced sub-pixels; wherein the plurality of sub-pixels include a first sub-pixel, a second sub-pixel, and a third sub-pixel; the first sub-pixel, the second sub-pixel, and the third sub-pixel are respectively corresponding to a red sub-pixel, a blue sub-pixel, and a green sub-pixel; and wherein the first sub-pixel, the second sub-pixel, and the third sub-pixel are all centrosymmetric patterns.

Further, the plurality of wire include a first wire, a second wire, a third wire, and a fourth wire; wherein the first wire surrounds the first sub-pixel, the second wire surrounds the second sub-pixel, the third wire surrounds the third sub-pixel, and the fourth wire surrounds the other third sub-pixel; and the fourth wire located in the infrared light-transmitting region further surrounds two through-holes arranged in a first direction; and wherein the fourth wire is alternatively arranged with the third wire along the first direction, and along a second direction perpendicular to the first direction.

Further, the two through-holes surrounded by the fourth wire are respectively located on both sides of the third sub-pixel.

Further, a shape surrounded by the third wire is a hexagonal shape with a central symmetry, and a shape surrounded by the fourth wire is a central symmetrical pattern; wherein the shape surrounded by the fourth wire includes a first virtual rectangle and a second virtual rectangle symmetrically disposed about the second direction, and a first virtual isosceles trapezoid and a second virtual isosceles trapezoid symmetrically disposed about the second direction; wherein an upper base of the first virtual isosceles trapezoid overlaps with a side of the first virtual rectangle.

Further, a center of the shape surrounded by the third wire overlaps with a center of the third sub-pixel surrounded by the third wire; and a center of the shape surrounded by the fourth wire overlaps with a center of the third sub-pixel surrounded by the fourth wire.

Further, the two through-holes surrounded by the fourth wire is symmetrical about a center of the third sub-pixel surrounded by the fourth wire.

Further, in the first direction, a minimum distance between the third sub-pixel and each of the two through-holes in a shape surround by the fourth wire is defined as a first distance; a minimum distance between the third sub-pixel in a shaped surrounded by the third wire and the through-hole is defined as a second distance, and the first distance is less than the second distance.

Further, orthographic projections of the two through-holes on the substrate completely overlaps with orthographic projections of the least one opening region on the substrate.

Further, shapes of orthographic projections of the two through-holes on the substrate comprise one or more of a circle, an ellipse, and a rectangle.

According to the present application, wires located in an infrared light-transmitting region is located outside an opening region, thereby preventing the wires from blocking the opening region, improving light transmittance of the opening region in the infrared light-transmitting region, and improving infrared communication performance of display panel. It prevents touch grid from blocking the opening region to increase light transmittance of the opening region, thereby meeting standard of the light transmittance, and conducting an improved infrared communication performance of the display panel.

A black matrix layer of the present application has at least one through-hole, and the least one through-hole is located in the opening region, whereby the light transmittance of the opening region can be improved, and the infrared communication performance of the display panel can be improved. It prevents the black matrix layer from shielding the opening region to increase the light transmittance of the opening region, thereby meeting standard of the light transmittance, and conducting an improved infrared communication performance of the display panel.

BRIEF DESCRIPTION OF THE SEVERAL VIEWS OF THE DRAWINGS

In order to more clearly describe the technical solutions in the embodiments of the present application, the accompanying drawings required in the description of the embodiments will be briefly described below. It is obvious that the accompanying drawings in the following description are merely some embodiments of the present application, and other drawings may be obtained by those skilled in the art without creative efforts.

REFERENCE NUMERALS

Figure 1:
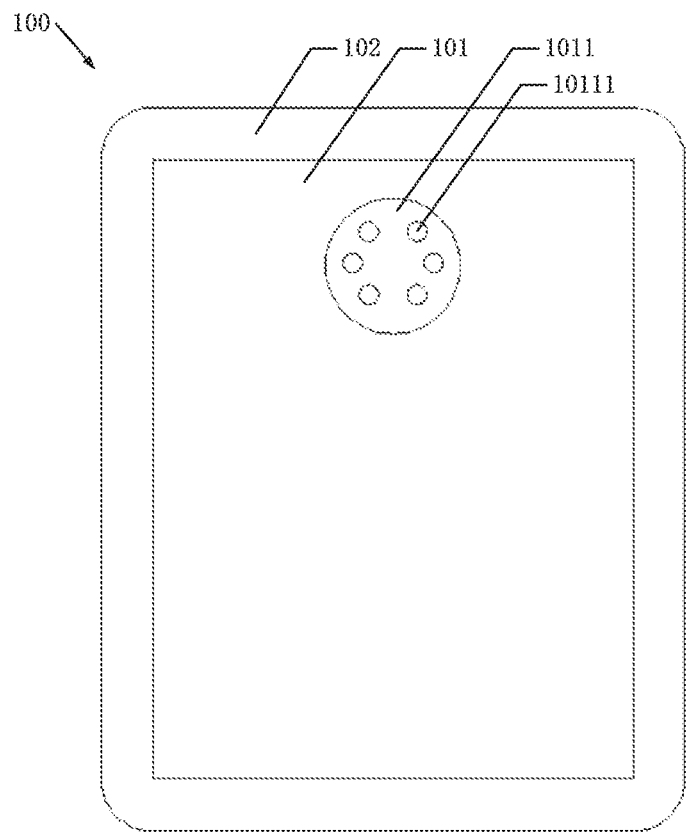
FIG. 1 is a schematic plan diagram of a display panel of the present application.

100. Display panel; 101. Display area;
102. Non-display area; 1011. Infrared light-transmitting region;
10111. Opening region;
1. Substrate; 2. Thin film transistor layer;
3. Light-emitting layer; 4. Encapsulation layer;
5. Touch layer; 6. Black matrix layer;
7. Color filter; 8. Protective layer;
31. First sub-pixel; 32. Second sub-pixel;
33. Third sub-pixel;
51. Touch unit; 511; First touch electrode;
512. Second touch electrode; 513. Wire;
5131. First wire; 5132. Second wire;
5133. Third wire; 5134. Fourth wire;
51341. First virtual rectangle; 51342. Second virtual rectangle;
51343. First virtual isosceles trapezoid; 51344. Second virtual isosceles trapezoid;
61. Through-hole.

DESCRIPTION OF SPECIFIC EMBODIMENTS OF THE INVENTION

The following describes in detail preferred embodiments of the present application in conjunction with the accompanying drawings in order to fully introduce the technical content of the present application to those skilled in the art. The present application is demonstrated to be practiced by examples. It makes the technical content of the present application clearer and easier for those skilled in the art to understand. However, the disclosure can be embodied by many different forms of embodiments, and protection scope of the disclosure is not limited to the embodiments mentioned herein. Description of the following embodiments is not intended to limit the scope of the disclosure.

Directional terms mentioned in the present disclosure, such as "up", "down", "front", "rear", "left", "right", "inside", "outside", "side" etc., only refer to directions in the drawings. The directional terms used herein are used to explain and describe the present disclosure, rather than to limit the protection scope of the present disclosure.

In the drawings, components with a same structure are denoted by same reference numerals, and components with similar structures or function are denoted by similar reference numerals. Furthermore, dimensions and thicknesses of each component shown in the drawings are arbitrarily shown for ease of understanding and description, and the present disclosure is not limited to the dimensions and thicknesses of each component.

Embodiment 1

As shown in FIG. 1, a display panel 100 is provided. The display panel 100 includes a display area 101 and a non-display area 102 surrounding the display area 101. The display area 101 has at least one infrared light-transmitting region 1011, and the infrared light-transmitting region 1011 has at least one opening region 10111.

Figure 2:
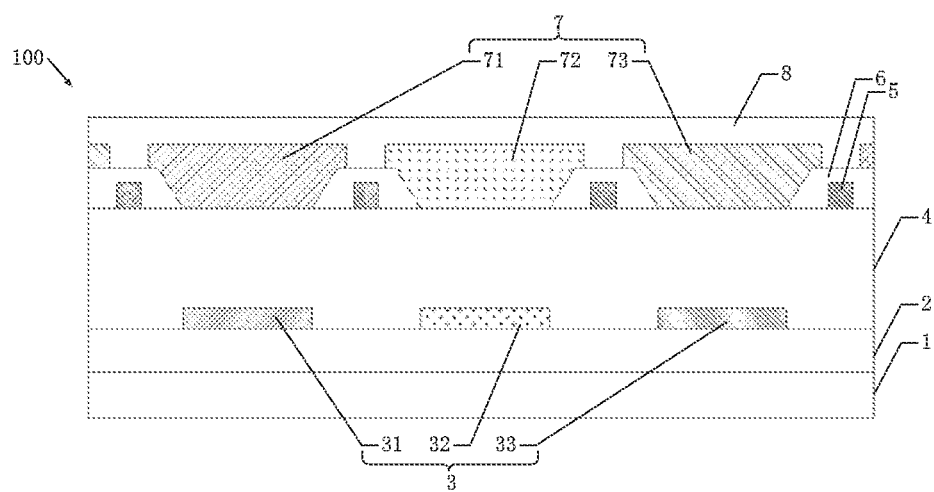
FIG. 2 is a schematic structural diagram of a display panel of the present application.

As shown in FIG. 2, the display panel 100 includes a substrate 1, a thin film transistor layer 2, a light-emitting layer 3, an encapsulation layer 4, a touch layer 5, a black matrix layer 6, a color filter 7, and a protective layer 8.

Material of the substrate 1 is one or more of glass, polyimide, polycarbonate, polyethylene terephthalate and polyethylene naphthalate. The substrate 1 has a better impact resistance and can effectively protect the display panel 100.

The thin film transistor layer 2 is disposed on the substrate 1. The thin film transistor layer 2 includes a gate, a gate insulating layer, an active layer, a source/drain layer, and the like.

Figure 3:
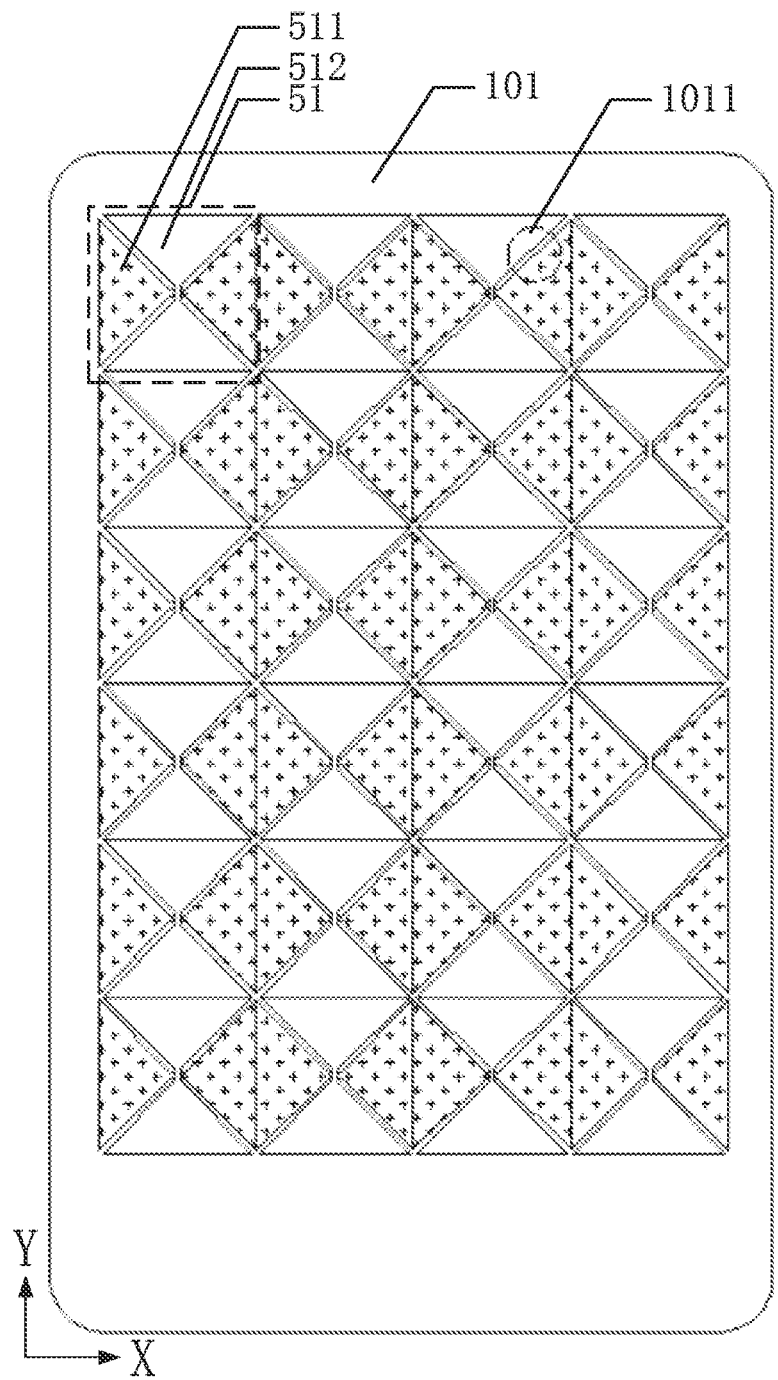
FIG. 3 is a schematic plan diagram of a touch layer of the present application.

As shown in FIG. 2 and FIG. 3, the light-emitting layer 3 is disposed on a side of the thin film transistor layer 2 away from the substrate 1. The light-emitting layer 3 includes a plurality of sub-pixels spaced apart from each other. The plurality of sub-pixels includes a first sub-pixel 31, a second sub-pixel 32, and a third sub-pixel 33. The first sub-pixel 31, the second sub-pixel 32, and the third sub-pixel 33 are one of a red sub-pixel, a blue sub-pixel, and a green sub-pixel, respectively. In this embodiment, the first sub-pixel 31 is a red sub-pixel, the second sub-pixel 32 is a blue sub-pixel, and the third sub-pixel 33 is a green sub-pixel. The first sub-pixel 31, the second sub-pixel 32, and the third sub-pixel 33 are all centrosymmetric patterns.

The encapsulation layer 4 is disposed on a side of the light-emitting layer 3 away from the substrate 1. The encapsulation layer is mainly used to prevent water and oxygen from entering the light-emitting layer and to improve a service life of the display panel 100.

The touch layer 5 is disposed on a side of the encapsulation layer 4 away from the substrate 1.

As shown in FIG. 2, a black matrix layer 6 is disposed on a side of the touch layer 5 away from the substrate 1.

Figure 4:
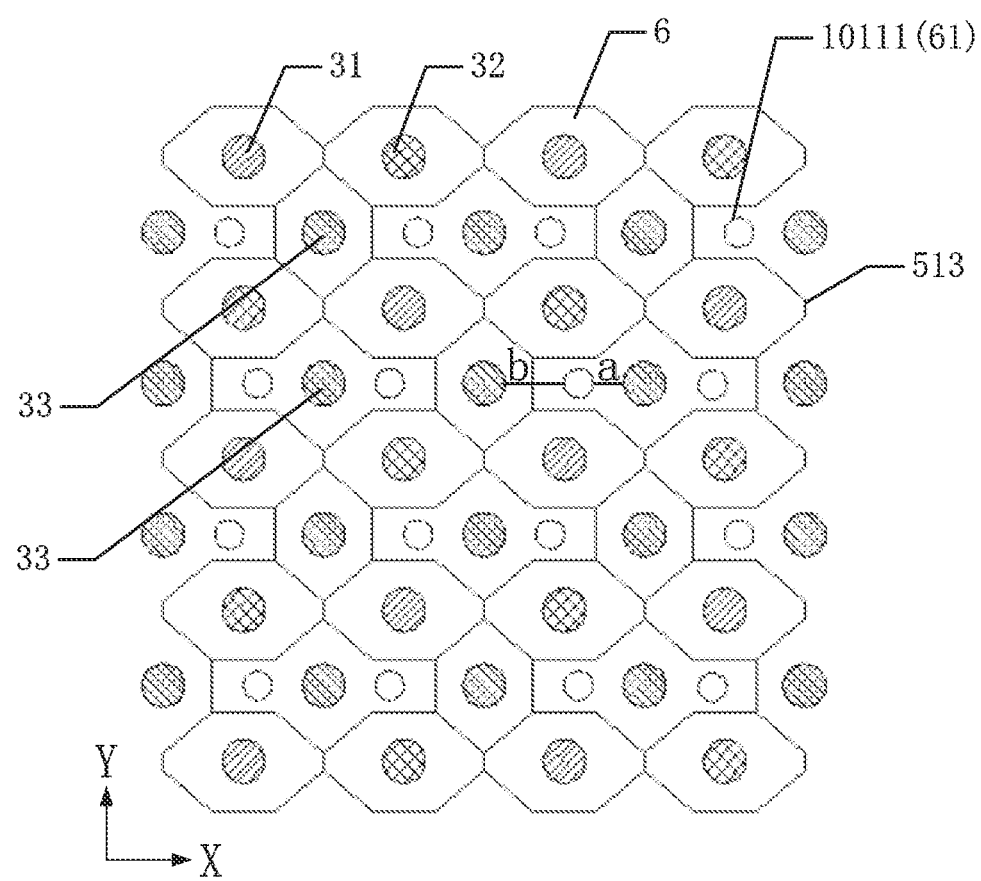
FIG. 4 is an enlarged schematic diagram of a red light-transmitting region of FIG. 3 according to Embodiment 1.

As shown in FIG. 2 and FIG. 4, the black matrix layer 6 is located between adjacent sub-pixels, thereby preventing the black matrix layer 6 from blocking the sub-pixels and preventing crosstalk of lights emitted from the adjacent sub-pixels.

As shown in FIG. 4, the black matrix layer 6 has at least one through-hole 61. The through-hole 61 is located in the opening region 10111. In an embodiment, an orthographic projection of the through-hole 61 on the substrate 1 completely overlaps with an orthographic projection of the opening region 10111 on the substrate 1. A shape of the orthographic projection of the through-hole 61 on the substrate 1 is circular. In this way, light transmittance of the opening region can be improved, and infrared communication performance of the display panel can be improved. It prevents the black matrix layer from blocking the opening region to increase the light transmittance thereof and to reach the standard the light transmittance, which conducts infrared communication performance of the display panel improved.

As shown in FIG. 3, the touch layer 5 includes a plurality of touch units 51 arranged in an array. Each of the plurality of touch units 51 includes a touch electrode. In an embodiment, the touch electrode includes two first touch electrodes 511 electrically connected to each other and arranged along a first direction X, and two second touch electrodes 512 electrically connected to each other and arranged along a second direction Y perpendicular to the first direction X.

As shown in FIG. 4, the first touch electrode 511 and the second touch electrode 512 each include a touch grid formed by a wire 513. Wherein the wire 513 located in the infrared light-transmitting region 1011 is located outside the opening region 10111. In this way, it is possible to prevent the wire 513 from shielding the opening region, improve the light transmittance of the opening region 10111, and improve the infrared communication performance of the display panel 100. It is possible to prevent the touch grid from shielding the opening region 10111, thereby increasing the light transmittance of the opening region 10111, meeting the standard of the light transmittance, and improving the infrared communication performance of the display panel 100.

As shown in FIG. 4, the wire 513 includes a first wire 5131, a second wire 5132, a third wire 5133, and a fourth wire 5134. In an embodiment, the wire 513 of the touch electrode in the touch unit in which the infrared light-transmitting region 1011 is located includes a first wire 5131, a second wire 5132, a third wire 5133, and a fourth wire 5134. Since the wire 513 of the other touch unit 51 does not have a chance to block the infrared light-transmitting region, the wire 513 of the touch electrode of the other touch unit 513 may include only the first wire 5131, the second wire 5132, and the third wire 5133.

As shown in FIG. 4, the first wire 5131 surrounds the first sub-pixels 31, the second wire 5132 surrounds the second sub-pixel 32, the third wire 5133 surrounds the third sub-pixel 33, and the fourth wire 5134 surrounds the third sub-pixel 33.

As shown in FIG. 4, the fourth wire 5134 located in the infrared light-transmitting region 1011 also surrounds two through-holes 61 arranged in the first direction X. The two through-holes 61 in a shape surrounded by the fourth wire 5134 are respectively located on both sides of the third sub-pixel 33 in the shape.

The fourth wire 5134 is alternatively arranged with the third wire 5133 in the first direction X and in the second direction Y.

Figure 5:
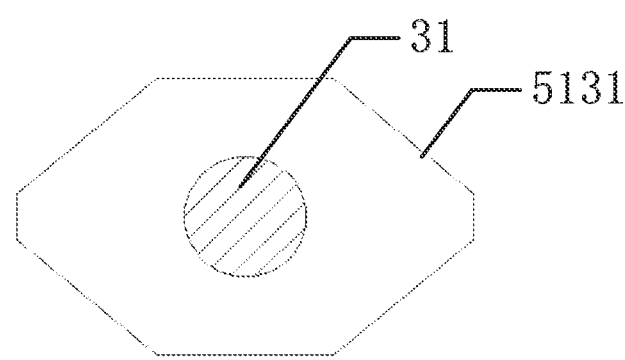
FIG. 5 is an enlarged schematic diagram of a first wire.

As shown in FIG. 5, a shape surrounded by the first wire 5131 is an octagonal shape with a center symmetry. A center of the shape surrounded by the first wire 5131 overlaps a center of the first sub-pixel 31 surrounded by the first wire 5131.

Figure 6:
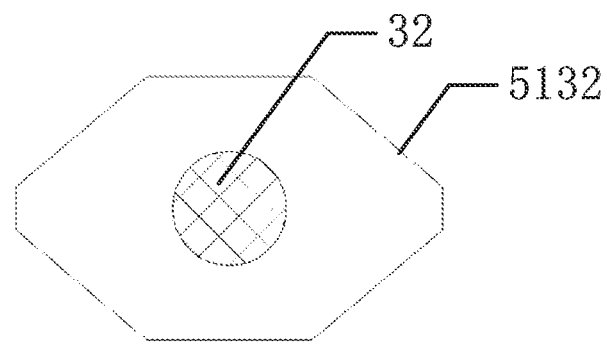
FIG. 6 is an enlarged schematic diagram of a second wire.

As shown in FIG. 6, a shape surrounded by the second wire 5132 is an octagonal shape with a center symmetry. A center of the shape surrounded by the second wire 5132 overlaps a center of the second sub-pixel 32 surrounded by the second wire 5132.

Figure 7:
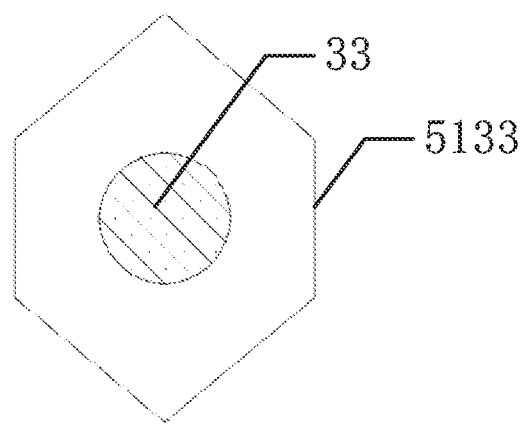
FIG. 7 is an enlarged schematic diagram of a third wire.

As shown in FIG. 7, a shape surrounded by the third wire 5133 is a hexagonal shape with a center symmetry. A center of the shape surrounded by the third wire 5133 overlaps a center of the third sub-pixel 33 surrounded by the third wire 5133.

Figure 8:
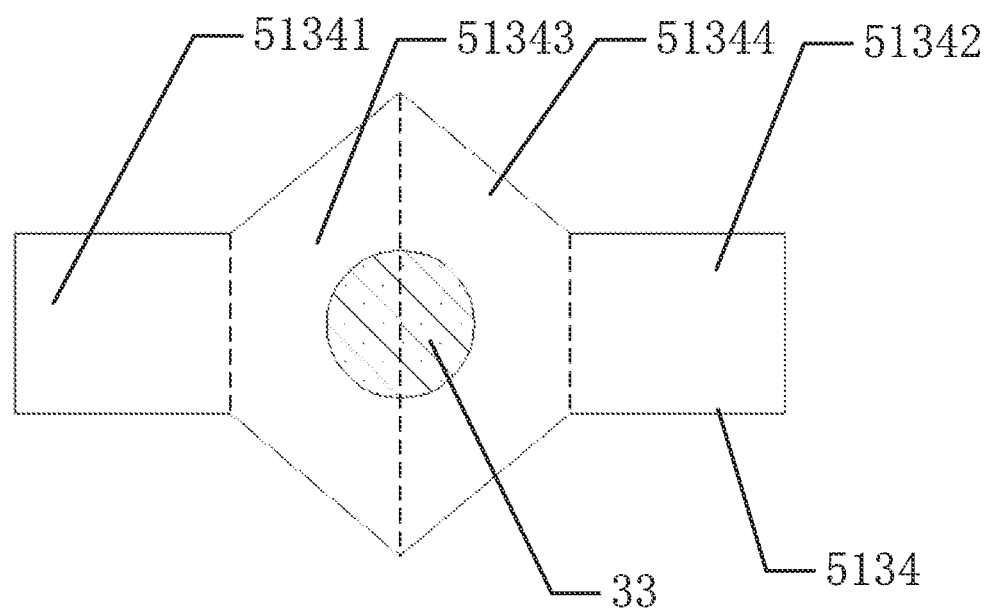
FIG. 8 is an enlarged schematic diagram of a fourth wire.

As shown in FIG. 8, a shape surrounded by the fourth wire 5134 is a central symmetrical pattern. The shape surrounded by the fourth wire 5134 includes a first virtual rectangle 51341 and a second virtual rectangle 51342 symmetrically disposed with respect to the second direction Y, and a first virtual isosceles trapezoid 51343 and a second virtual isosceles trapezoid 51344 symmetrically disposed with respect to the second direction Y. An upper base of the first virtual isosceles trapezoid 51343 overlaps with a side of the first virtual rectangle 51341. A center of the shape surrounded by the fourth wire 5134 overlaps with a center of the third sub-pixel 33 surrounded by the fourth wire 5134, whereby the color shift can be improved and the mura phenomenon can be reduced.

As shown in FIG. 4, the two through-holes 61 surrounded by the fourth wire 5134 are symmetrical about a center of the third sub-pixel 33 surrounded by the fourth wire 5134.

As shown in FIG. 4, in the first direction X, a minimum distance between the third sub-pixel 33 and the through-hole 61 in the shape surrounded by the fourth wire 5134 is defined as a first distance a. A minimum distance between the third sub-pixel in the shape surrounded by the third wire 5133 and the through-hole is defined as a second distance b. The first distance a is less than the second distance b, thereby improving the color shift and reducing the mura phenomenon.

Embodiment 2

Figure 9:
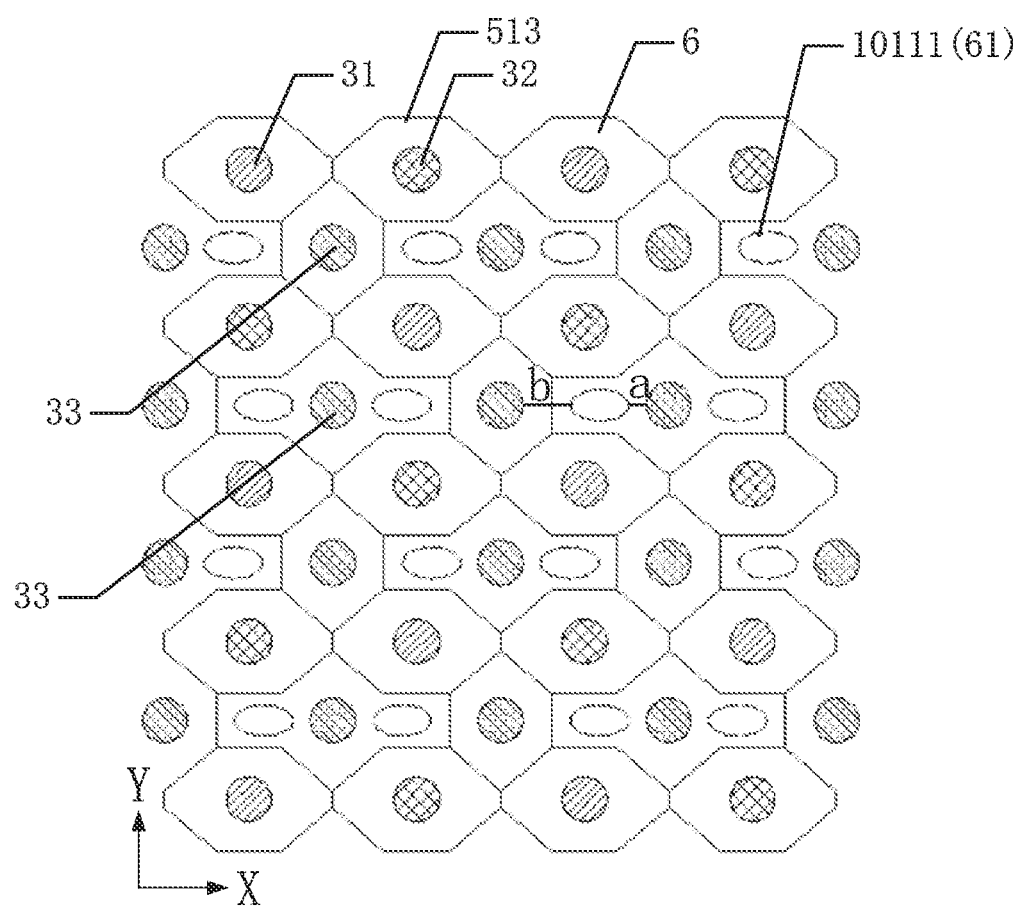
FIG. 9 is an enlarged schematic diagram of a red light-transmitting region of FIG. 3 according to Embodiment 2.

As shown in FIG. 9, it includes most features described in Embodiment 1. Differences therebetween lie in that, the shape of orthographic projection of the through-hole 61 on the substrate 1 is elliptical. In an embodiment, in lines (corresponding to the first direction) where the infrared light-transmitting region 1011 is located, or in columns (corresponding to the second direction) where the infrared light-transmitting region 1011 is located, the wire 513 of the touch electrode in the touch unit 51 includes the first wire 5131, the second wire 5132, the third wire 5133, and the fourth wire 5134.

The wire 513 located in the infrared light-transmitting region 1011 is located outside the opening region 10111. In this way, the light transmittance of the opening region 10111 can be improved, and the infrared communication performance of the display panel 100 can be improved. It prevents the touch grid from shielding the opening region 10111, thereby increasing the light transmittance of the opening region 10111, meeting the standard of the light transmittance, and improving the infrared communication performance of the display panel 100.

Embodiment 3

Figure 10:
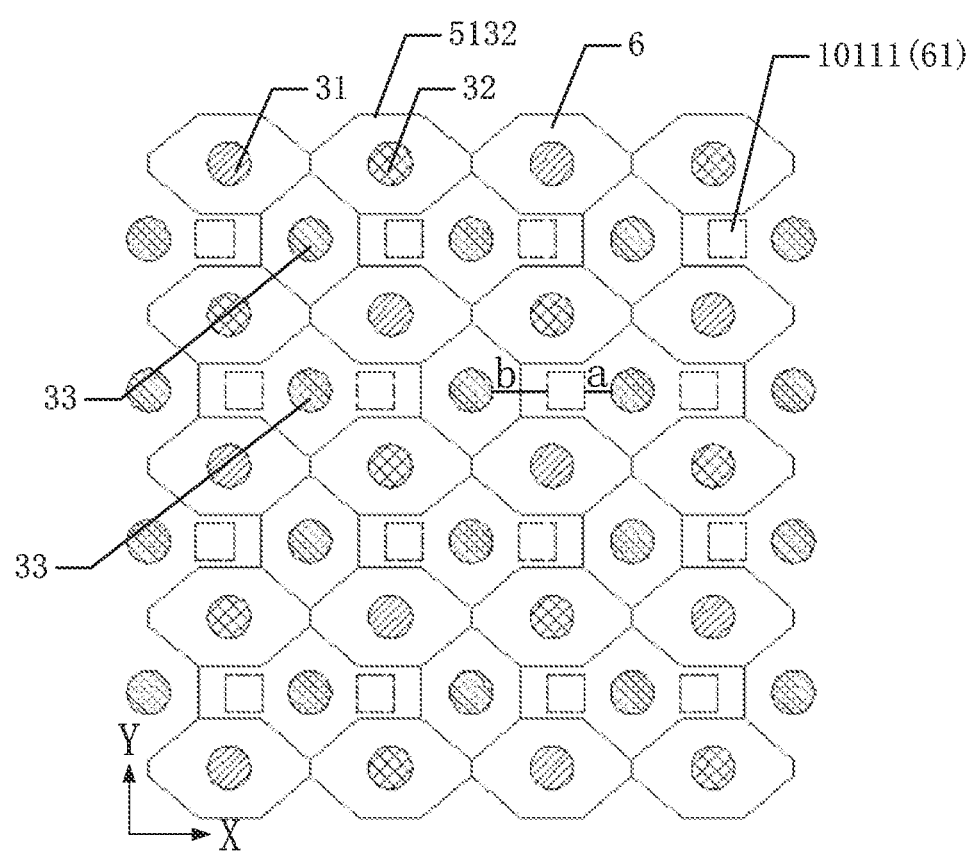
FIG. 10 is an enlarged schematic diagram of a red light-transmitting region of FIG. 3 according to Embodiment 3.

As shown in FIG. 10, it includes most features described in Embodiment 1. Differences therebetween lie in that, the shape of orthographic projection of the through-hole 61 on the substrate 1 is rectangular. In an embodiment, the wire 513 of the touch electrode in each of the touch units in the display area 101 includes a first wire 5131, a second wire 5132, a third wire 5133, and a fourth wire 5134. Thus, it is possible to satisfy the requirement that the display panel 100 be modified from a non-depolarizer display panel to a depolarizer display panel without changing a touch gird mask formed by the wire 513. When the position of the infrared light-transmitting region 1011 changes, it is possible to reduce the production cost of the display panel 100 without changing the touch gird mask formed by the wire 513.

The wire 513 located in the infrared light-transmitting region 1011 is located outside the opening region 10111. Thus, the light transmittance of the opening region 10111 can be improved, and the infrared communication performance of the display panel 100 can be improved. It prevents the touch grid from shielding the opening region 10111, thereby increasing the light transmittance of the opening region 10111, meeting the standard of the light transmittance, and improving the infrared communication performance of the display panel 100.

Further, a display panel provided by the present application is described in detail above. The principles and embodiments of the present application are described herein by applying specific examples. The description of the above embodiments is only used to help understand the method and core idea of the present application. At the same time, for those skilled in the art, according to the idea of the present application, there will be some changes in specific embodiments and application scope. In conclusion, the contents of the present specification shall not be construed as limiting the present application.

What is claimed is:

1. A display panel, comprising a display area; wherein the display area has one or more infrared light-transmitting regions, and at least one opening region is provided in each of one or more infrared light-transmitting regions;
    wherein the display panel comprises:
    a substrate;
    a touch layer disposed on the substrate and including a touch electrode; wherein the touch electrode comprises a touch grid formed by a plurality of wires;
    a light-emitting layer disposed between the substrate and the touch layer, wherein the light-emitting layer comprises a plurality of spaced sub-pixels; and
    a black matrix layer disposed on a side of the touch layer away from the substrate and provided with a through-hole; wherein the through-hole is located in the at least one opening region;
    wherein the plurality of sub-pixels include a first sub-pixel, a second sub-pixel, and a third sub-pixel; the first sub-pixel, the second sub-pixel, and the third sub-pixel are respectively corresponding to a red sub-pixel, a blue sub-pixel, and a green sub-pixel;
    wherein the first sub-pixel, the second sub-pixel, and the third sub-pixel are all centrosymmetric patterns;
    wherein the plurality of wire located in the infrared light-transmitting region is located outside the at least one opening region;
    wherein the plurality of wire include a first wire, a second wire, a third wire, and a fourth wire;
    wherein the first wire surrounds the first sub-pixel, the second wire surrounds the second sub-pixel, the third wire surrounds the third sub-pixel, and the fourth wire surrounds the other third sub-pixel; and the fourth wire located in the infrared light-transmitting region further surrounds two through-holes arranged in a first direction;
    wherein the fourth wire is alternatively arranged with the third wire along the first direction, and along a second direction perpendicular to the first direction.

2. The display panel of claim 1, wherein the two through-holes surrounded by the fourth wire are respectively located on both sides of the third sub-pixel.

3. The display panel of claim 2, wherein a shape surrounded by the third wire is a hexagonal shape with a central symmetry, and
    a shape surrounded by the fourth wire is a central symmetrical pattern; wherein the shape surrounded by the fourth wire includes a first virtual rectangle and a second virtual rectangle symmetrically disposed about the second direction, and a first virtual isosceles trapezoid and a second virtual isosceles trapezoid symmetrically disposed about the second direction; wherein an upper base of the first virtual isosceles trapezoid overlaps with a side of the first virtual rectangle.

4. The display panel of claim 3, wherein a center of the shape surrounded by the third wire overlaps with a center of the third sub-pixel surrounded by the third wire; and a center of the shape surrounded by the fourth wire overlaps with a center of the third sub-pixel surrounded by the fourth wire.

5. The display panel of claim 3, wherein the two through-holes surrounded by the fourth wire is symmetrical about a center of the third sub-pixel surrounded by the fourth wire.

6. The display panel of claim 1, wherein in the first direction, a minimum distance between the third sub-pixel and the through-hole in a shape surround by the fourth wire is defined as a first distance; a minimum distance between the third sub-pixel in a shape surrounded by the third wire and the through-hole is defined as a second distance, and the first distance is less than the second distance.

7. The display panel of claim 1, wherein an orthographic projection of the through-hole on the substrate completely overlaps with orthographic projections of the least one opening region on the substrate.

8. The display panel of claim 1, wherein a shape of orthographic projection of the through-hole on the substrate comprise one or more of a circle, an ellipse, and a rectangle.

* * * * *